(No Model.)
W. MYERS.
FILTER.
No. 590,020. Patented Sept. 14, 1897.
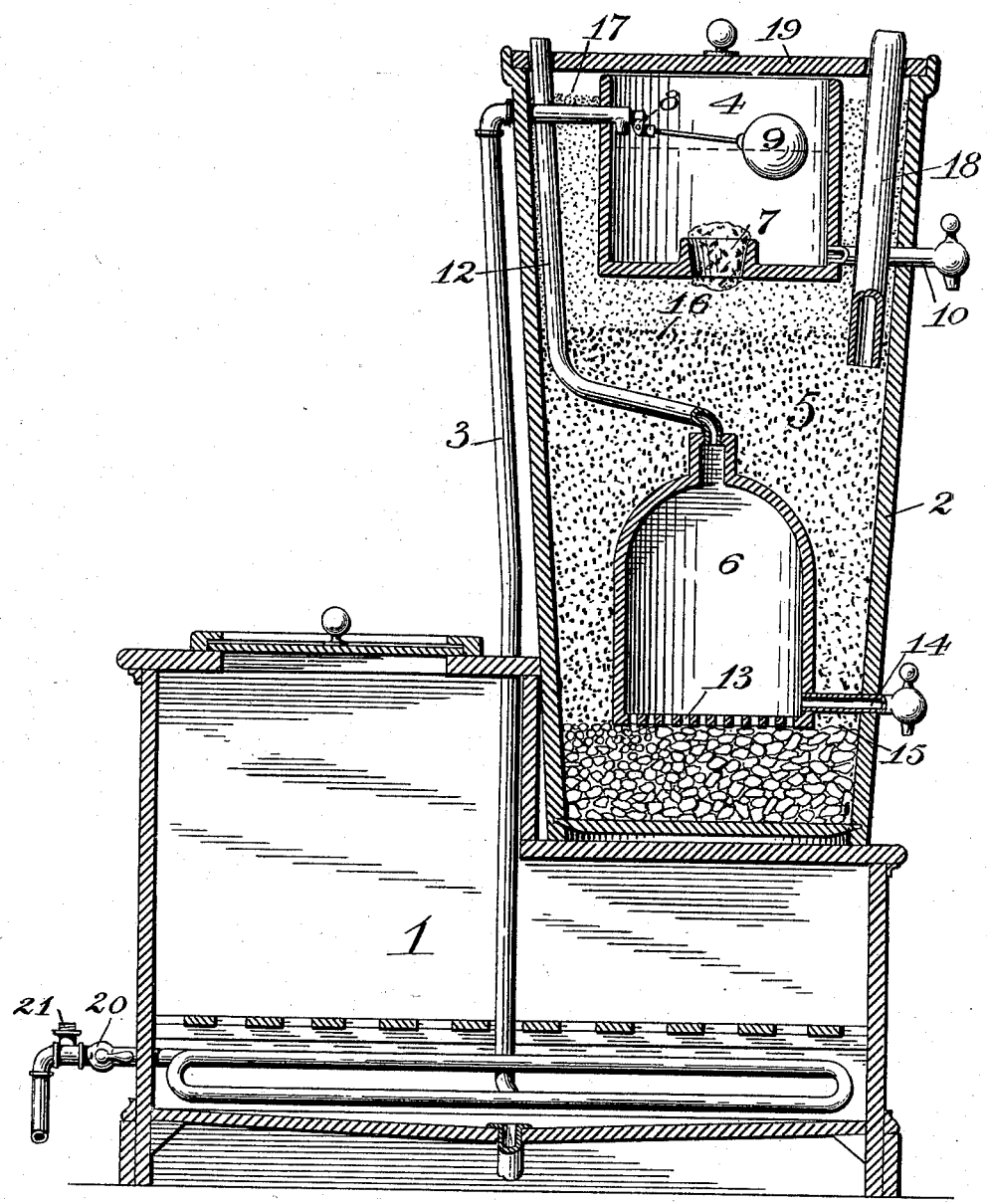
WITNESSES
"J. Frank Culverwell."
H. H. Byrne.
INVENTOR,
William Myers.
By John Wedderburn, Attorney

UNITED STATES PATENT OFFICE.

WILLIAM MYERS, OF BROOKLYN, NEW YORK.

FILTER.

SPECIFICATION forming part of Letters Patent No. 590,020, dated September 14, 1897.

Application filed November 27, 1896. Serial No. 613,572. (No model.)

*To all whom it may concern:*

Be it known that I, WILLIAM MYERS, a citizen of the United States, residing at Brooklyn, in the county of Kings and State of New York, have invented certain new and useful Improvements in Filters; and I do hereby declare the following to be a full, clear, and exact description of the invention, such as will enable others skilled in the art to which it appertains to make and use the same.

This invention has reference to a novel construction in a filter, the object being to provide a filter which readily supplies cooled clear water.

The invention consists in the features of construction hereinafter specifically described and claimed.

The accompanying drawing, forming a part of this specification, is a vertical section of a filter constructed in accordance with this invention.

Referring now to said drawing, 1 indicates the ice-box of a refrigerator, and 2 the filter-casing. A water-supply pipe 3 for supplying water to the filter passes through said ice-box and is suitably coiled therein to receive the cooling effects and the cool drippings from the ice-box, whereby the water is cooled before it passes into the filter. This ice-box can be of any convenient construction, and the manner in which the pipes are situated to receive the cooling effect does not form a part of this invention. The filter-casing is provided with three chambers—namely, an upper or receiving chamber 4, a filtering-chamber 5, and a collecting-chamber 6. The receiving-chamber 4 is situated at the upper end of the casing 2 and has an upper end and an opening 7 in its bottom. The supply-pipe 3 communicates with the upper portion of this chamber 4 and is provided with a valve 8, controlled by a float 9. The said receiving-chamber 4 is provided with a valve pipe or passage 10, leading from the bottom thereof through the side of the casing, and a sponge or other porous filling is placed in the opening 7 in the bottom of said chamber 4. The collecting-chamber 6, which receives the filtered water, is situated in the lower end of the casing and is provided at its upper end with a pipe or passage 12, leading to the outside air and forming a vent. This pipe or passage 12 extends along the side of the casing and through the upper end thereof, so that its upper end is above the level of the water in the receiving-chamber 4, for obvious reasons. The bottom of said chamber 6 is provided with a plurality of perforations 13 for the entrance of the filtered water, while a valved pipe or passage 14 leads from the lower end of the said chamber 6 through the side of the casing for the purpose of drawing off the filtered water. The filtering-chamber comprises the space within the casing not occupied by the chambers 4 and 6 and is filled with any suitable filtering material, conveniently charcoal, and in this connection it is preferable to use both animal and wood charcoal, the animal charcoal occupying a space extending from the screen 15, near the lower end of the casing, to a point about half-way to the top thereof, as shown at 16, while the wood-charcoal is placed upon this layer and extends almost to the upper end of the chamber 4, as shown at 17. A pipe or passage 18 extends downwardly through the wood-charcoal into the top part of the animal charcoal and is open at both ends. The casing is provided with a suitable cover 19, as shown.

It will be understood, of course, that the supply-pipe 3 is provided with a suitable valve 20 and preferably with a branch cock 21. Ordinarily the cock 21 is closed and the valve 20 opened. Water therefore passes through the ice-box of the refrigerator and is cooled thereby, and then passes into the receiving-chamber 4. While in this chamber 4, a certain amount of the matters held in suspension are precipitated, while other matters are removed as the water passes through the porous filling within the opening 7. The water then passes downwardly through the filtering matters, perforations 13, and passage 14, and then upwardly into the chamber 6. The vent 12 allows the filtered water to rise within this chamber 6 and also to be drawn off through the pipe 14. It will be understood, of course, that this filter can be made for domestic purposes or for filtering the water-supply of cities, and therefore can be made either of earthenware jars or of masonry.

To clean out the filter, the valve 20 is closed to cut off the water-supply, after which the cover 19 is removed and the passage 10 opened, so that the water in the chamber 4 runs out. The filling is then removed and communication established between the cock 21 and the upper end of the pipe 18 by means of a hose or the like. Water is then turned on at the cock and allowed to run for some time. This water passes out of the passage 18 and carries off the impurities through the opening 7 and passage 10. When it is noticed that the water entering the chamber 4 through the opening 7 is clear, the passage 14 is opened, so that the water will pass downwardly and out through this passage 14. This is continued a short time and then the passage 14 is again closed and the water allowed to pass upwardly through the opening 7 and passage 14, and if it is found to be clean the filter need not be further cleaned. Then this passage 14 and the cock 21 are closed and the valve 20 opened as before and the cover placed upon the casing.

Having thus described my invention, what I claim as new, and desire to secure by Letters Patent, is—

A filter consisting of a casing having a receiving-chamber at its upper end, a collecting-chamber at its lower end, a vent leading from the upper end of said collecting-chamber, a filtering-chamber surrounding the said receiving and collecting chambers and communicating therewith, valved pipes or passages leading from the said receiving and collecting chambers through the side of said casing, and a pipe or passage leading from the upper end of said filtering-chamber toward the lower end of the same.

In testimony whereof I have signed this specification in the presence of two subscribing witnesses.

WILLIAM MYERS.

Witnesses:
HOWARD N. FIELD,
ADAM S. CAMERON.